(12) United States Patent
Terada et al.

(10) Patent No.: US 10,596,664 B2
(45) Date of Patent: Mar. 24, 2020

(54) ROBOT

(71) Applicant: KABUSHIKI KAISHA YASKAWA DENKI, Kitakyushu-shi (JP)

(72) Inventors: Atsushi Terada, Fukuoka (JP); Kazuhiro Yasutomi, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 280 days.

(21) Appl. No.: 14/490,652

(22) Filed: Sep. 18, 2014

(65) Prior Publication Data
US 2015/0076213 A1 Mar. 19, 2015

(30) Foreign Application Priority Data
Sep. 19, 2013 (JP) .................. 2013-194668

(51) Int. Cl.
*B23K 37/02* (2006.01)
*B25J 17/02* (2006.01)
*B25J 19/00* (2006.01)
*B23K 9/133* (2006.01)

(52) U.S. Cl.
CPC .......... *B23K 37/0282* (2013.01); *B23K 9/133* (2013.01); *B25J 17/0283* (2013.01); *B25J 19/00* (2013.01); *Y10S 901/28* (2013.01); *Y10S 901/42* (2013.01)

(58) Field of Classification Search
CPC .. B23K 37/0282; B23K 9/133; B25J 17/0283; B25J 19/00; Y10S 901/28; Y10S 901/42
See application file for complete search history.

(56) References Cited

U.S. PATENT DOCUMENTS

| D267,883 | S | * | 2/1983 | Susnjara | .................. D15/122 |
| 4,505,049 | A | * | 3/1985 | Kuno | .................. B25J 9/046 |
| | | | | | 33/1 PT |
| 5,595,671 | A | * | 1/1997 | David | .................. B23K 9/133 |
| | | | | | 219/137.62 |
| 6,557,742 | B1 | * | 5/2003 | Bobeczko | ............. B21F 23/002 |
| | | | | | 226/177 |

(Continued)

FOREIGN PATENT DOCUMENTS

| CN | 101031380 | 9/2007 |
| DE | 29720048 U1 | 3/1999 |

(Continued)

OTHER PUBLICATIONS

Japanese Office Action for corresponding JP Application No. 2013-194668, dated Sep. 1, 2015.

(Continued)

*Primary Examiner* — Devang R Patel
*Assistant Examiner* — Carlos J Gamino
(74) *Attorney, Agent, or Firm* — Mori & Ward, LLP

(57) ABSTRACT

A robot according to an embodiment includes a flange, a wrist arm, a forearm, and a feeder. The flange configured so that a welding torch is attached thereto and configured to rotate about a T axis. The wrist arm configured to rotate about a B axis substantially perpendicular to the T axis and configured to support the flange. The forearm configured to support the wrist arm. The feeder attached to a position between a base end and a tip end of the forearm and configured to feed a welding wire.

9 Claims, 7 Drawing Sheets

(56) References Cited

U.S. PATENT DOCUMENTS

| | | | |
|---|---|---|---|
| 7,202,442 B2* | 4/2007 | Nakagiri | B25J 19/0029 219/125.1 |
| 7,800,017 B2* | 9/2010 | Zamuner | B23K 9/287 219/124.02 |
| 8,003,916 B2* | 8/2011 | Ohara | B23K 9/133 219/124.34 |
| 8,079,285 B2* | 12/2011 | Kagawa | B23K 9/133 74/490.1 |
| 8,631,720 B2* | 1/2014 | Nakagiri | B25J 19/0029 74/490.02 |
| 9,056,397 B2* | 6/2015 | Okada | B25J 9/102 |
| 9,138,902 B2* | 9/2015 | Suzuki | B25J 19/0025 |
| 2002/0130153 A1* | 9/2002 | Plow | B23K 9/1336 226/190 |
| 2004/0261562 A1* | 12/2004 | Haniya | B25J 17/0283 74/490.02 |
| 2007/0151964 A1* | 7/2007 | Artelsmair | B23K 9/1333 219/137.2 |
| 2008/0156925 A1* | 7/2008 | Cooper | B23K 9/133 242/559.3 |
| 2008/0271561 A1 | 11/2008 | Ohara et al. | |
| 2009/0242535 A1* | 10/2009 | Minato | B23K 9/133 219/137.31 |
| 2012/0248084 A1* | 10/2012 | Romenesko | B23K 9/1336 219/137.7 |
| 2014/0263533 A1* | 9/2014 | Enyedy | B23K 9/1336 226/181 |
| 2015/0014383 A1* | 1/2015 | Patterson | B65H 51/32 226/181 |
| 2015/0014465 A1* | 1/2015 | Barea | B65H 59/388 242/419.8 |
| 2015/0076131 A1* | 3/2015 | Terada | B23K 9/133 219/137.63 |
| 2015/0343552 A1* | 12/2015 | Gelmetti | B23K 9/124 219/137.71 |
| 2016/0008905 A1* | 1/2016 | Izawa | B25J 15/0019 219/130.1 |
| 2016/0023358 A1* | 1/2016 | Saito | F16H 19/005 74/490.04 |
| 2016/0023360 A1* | 1/2016 | Saito | B25J 19/0029 74/490.04 |
| 2018/0050416 A1* | 2/2018 | Kachline | B23K 9/133 |

FOREIGN PATENT DOCUMENTS

| | | |
|---|---|---|
| EP | 1574302 | 9/2005 |
| EP | 1625920 | 2/2006 |
| JP | 2005-066610 | 3/2005 |
| JP | 2005-297069 | 10/2005 |
| JP | 2006-289503 | 10/2006 |
| JP | 2007-326151 | 12/2007 |
| JP | 2009-262226 | 11/2009 |
| JP | 2013-111716 | 6/2013 |
| JP | 2013-136066 | 7/2013 |
| JP | 2013-144301 | 7/2013 |

OTHER PUBLICATIONS

Extended European Search Report for corresponding EP Application No. 14185509.8-1712, dated Feb. 3, 2015.
Chinese Office Action for corresponding CN Application No. 201410462264.9, dated Aug. 27, 2015.

* cited by examiner

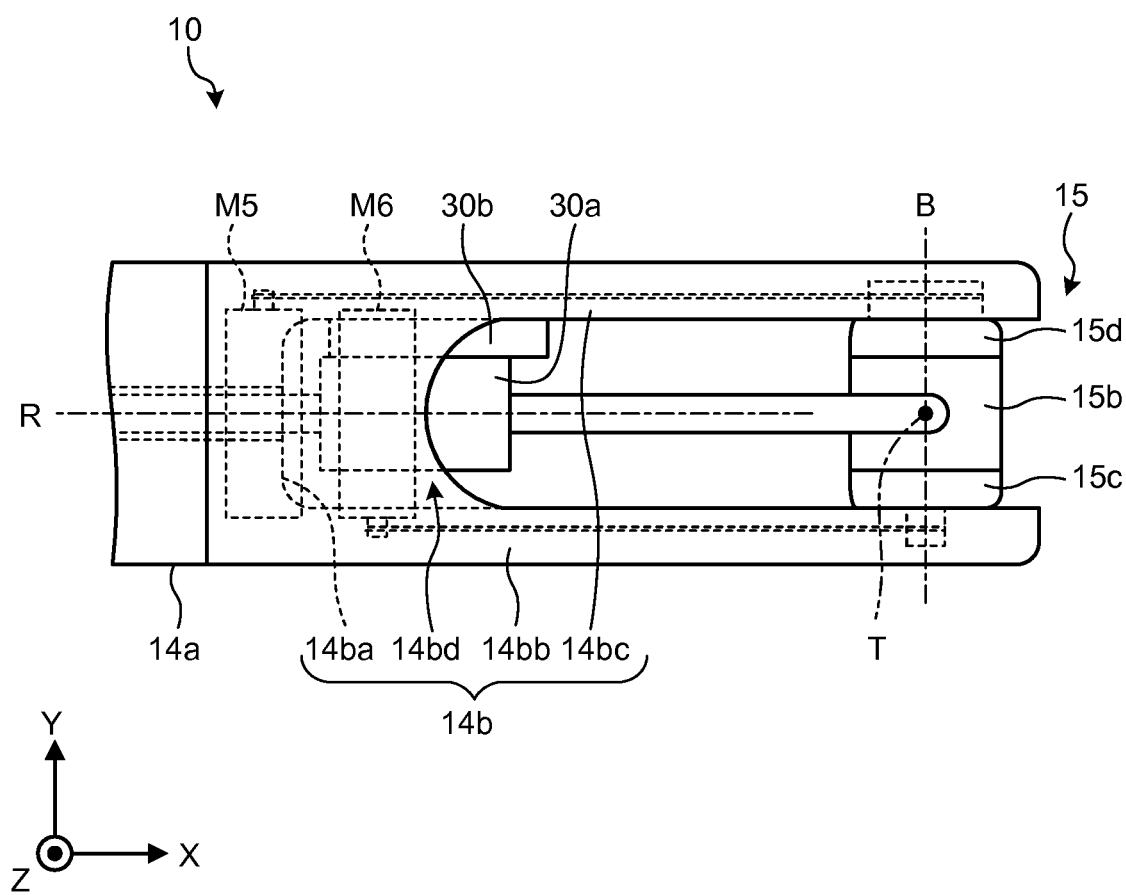

ROBOT

CROSS-REFERENCE TO RELATED APPLICATION

This application is based upon and claims the benefit of priority of the prior Japanese Patent Application No. 2013-194668, filed on Sep. 19, 2013, the entire contents of which are incorporated herein by reference.

FIELD

The embodiment discussed herein is directed to a robot.

BACKGROUND

Robots applied to arc welding are provided with a welding torch (hereinafter referred to as a "torch"). The torch needs to be fed with a welding wire, and a wire feeding device (hereinafter referred to as a "feeder") as described in Japanese Patent Application Laid-open No. 2005-66610, for example, is used for such feeding.

SUMMARY

A robot according to an embodiment includes a flange, a wrist arm, a forearm, and a feeder. The flange configured so that a welding torch is attached thereto and configured to rotate about a T axis. The wrist arm configured to rotate about a B axis substantially perpendicular to the T axis and configured to support the flange. The forearm configured to support the wrist arm. The feeder attached to a position between a base end and a tip end of the forearm and configured to feed a welding wire.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 3B is a planar schematic view illustrating the periphery of the upper arm.

DESCRIPTION OF EMBODIMENT

An embodiment of a robot will be described in detail with reference to the accompanying drawings. It should be noted that the embodiment in the following description is not intended to limit the scope of the invention.

An example of a robot applied for arc welding will be described. In the description, a welding torch is referred to as a "torch".

Figure 1:
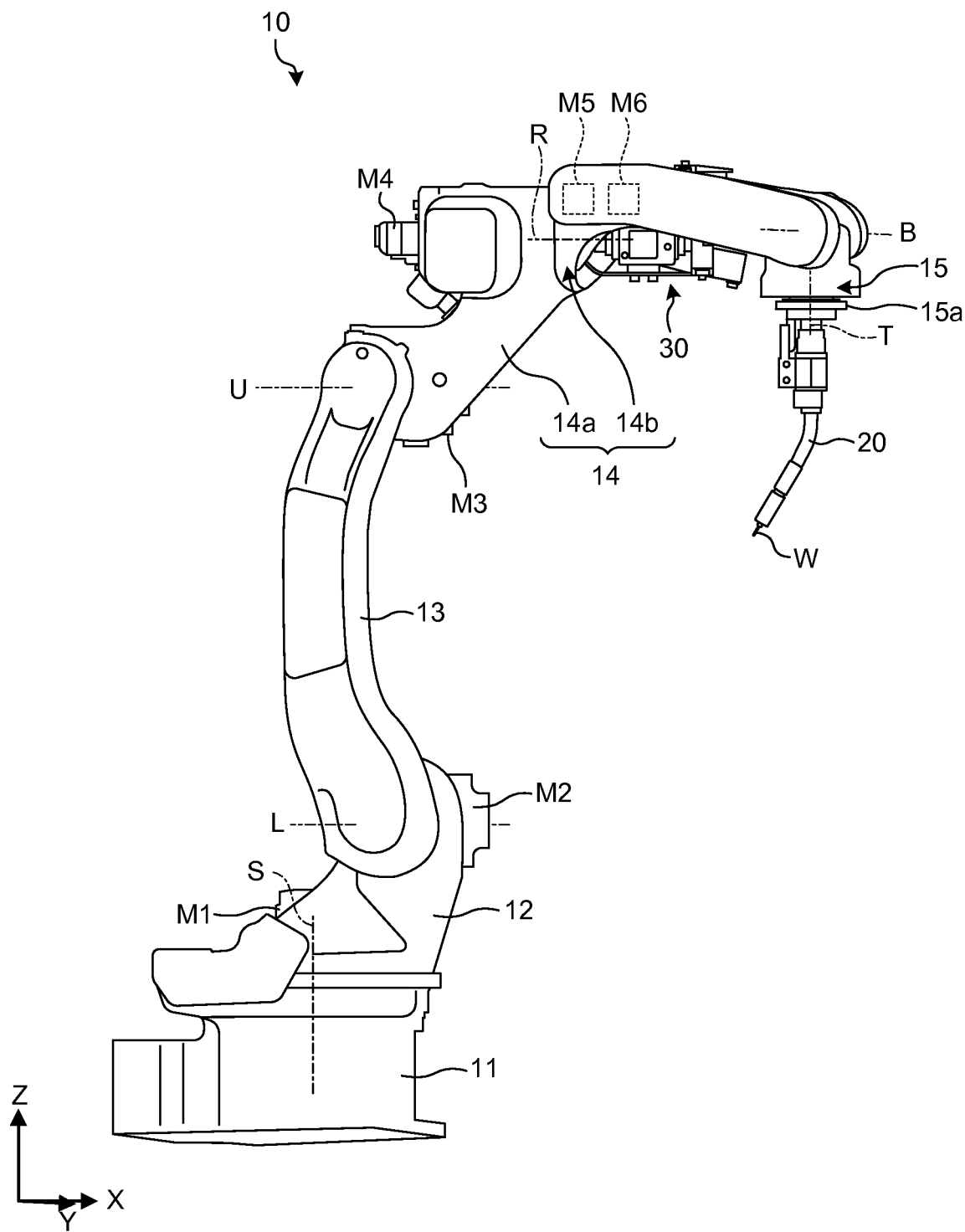
FIG. 1 is a perspective schematic view illustrating a robot according to an embodiment.

A robot 10 according to the embodiment will be generally described. FIG. 1 is a perspective schematic view illustrating the robot 10 according to the embodiment. For convenience sake, the positional relations between parts configuring the robot 10 will be described on the assumption that a pivot position and a posture of the robot 10 are basically kept in the state illustrated in FIG. 1. The state illustrated in FIG. 1 may be referred to as a "standard posture" of the robot 10. The installation surface side where a base 11 of the robot 10 is installed is referred to as a "base end side" and the peripheral area in the base end side of each component is referred to as a "base end portion". A flange 15a side of the robot 10 is referred to as a "tip end side" and the peripheral area in the end side of each component is referred to as a "tip end portion".

For easier comprehension, FIG. 1 illustrates a rectangular coordinate system in three dimensions that includes a Z-axis having the vertical upward direction as a positive direction. This rectangular coordinate system may be indicated also in other drawings referred to in the following description. In the embodiment, the positive direction of the X-axis indicates the front of the robot 10.

As FIG. 1 illustrates, the robot 10 is what is called a serial-link vertical-articulated robot that has six axes of rotary joint, which are an S axis, an L axis, a U axis, a R axis, a B axis, and a T axis. The robot 10 also has six servomotors M1, M2, M3, M4, M5, and M6. The robot 10 further includes the base 11, a pivot base 12, a lower arm 13, an upper arm 14, a wrist arm 15, and a feeder 30.

The upper arm 14 consists of a first arm 14a and a forearm 14b.

The base 11 is a support base fixed to a floor and the like (installation object) and rotatably supports the pivot base 12 about the S axis. When the servomotor M1 is driven, the base 11 and the pivot base 12 relatively rotate with respect to each other about the S axis. The pivot base 12 rotatably supports the base end portion of the lower arm 13 about the L axis perpendicular to the S axis. When the servomotor M2 is driven, the pivot base 12 and the lower arm 13 relatively rotate with respect to each other about the L axis.

The lower arm 13 rotatably supports, at its tip end portion, the base end portion of the first arm 14a of the upper arm 14 about the U axis parallel to the L axis. When the servomotor M3 is driven, the lower arm 13 and the first arm 14a relatively rotate with respect to each other about the U axis. The first arm 14a rotatably supports, at its tip end portion, the base end portion of the forearm 14b about the R axis perpendicular to the U axis. When the servomotor M4 is driven, the first arm 14a and the forearm 14b relatively rotate with respect to each other about the R axis.

The forearm 14b rotatably supports, at its tip end portion, the base end portion of the wrist arm 15 about the B axis perpendicular to the R axis. When the servomotor M5 is driven, power is transmitted via a power transmission mechanism (such as a belt and a pulley) incorporated in the forearm 14b, whereby the forearm 14b and the wrist arm 15 relatively rotate with respect to each other about the B axis.

The wrist arm 15 is provided with a torch 20. The wrist arm 15 has a flange 15a rotatable about the T axis perpendicular to the B axis and is provided with the torch 20 with the flange 15a interposed therebetween. When the servomotor M6 is driven, power is transmitted via a power transmission mechanism (such as a belt and a pulley) incorporated in the forearm 14b, whereby the flange 15a rotates about the T axis.

Mathematical accuracy is not necessarily required in the above-described words "perpendicular", "parallel", and the like, which allow substantial tolerances and differences. The word "perpendicular" in the embodiment does not always mean that two lines (axes) are orthogonal to each other on an identical plane but includes the case where two lines (axes) are in positional relations of torsion.

The feeder 30 intersects with the R axis between the base end portion and the tip end portion of the forearm 14b and feeds the torch 20 with a wire (welding wire) W.

Figure 2:
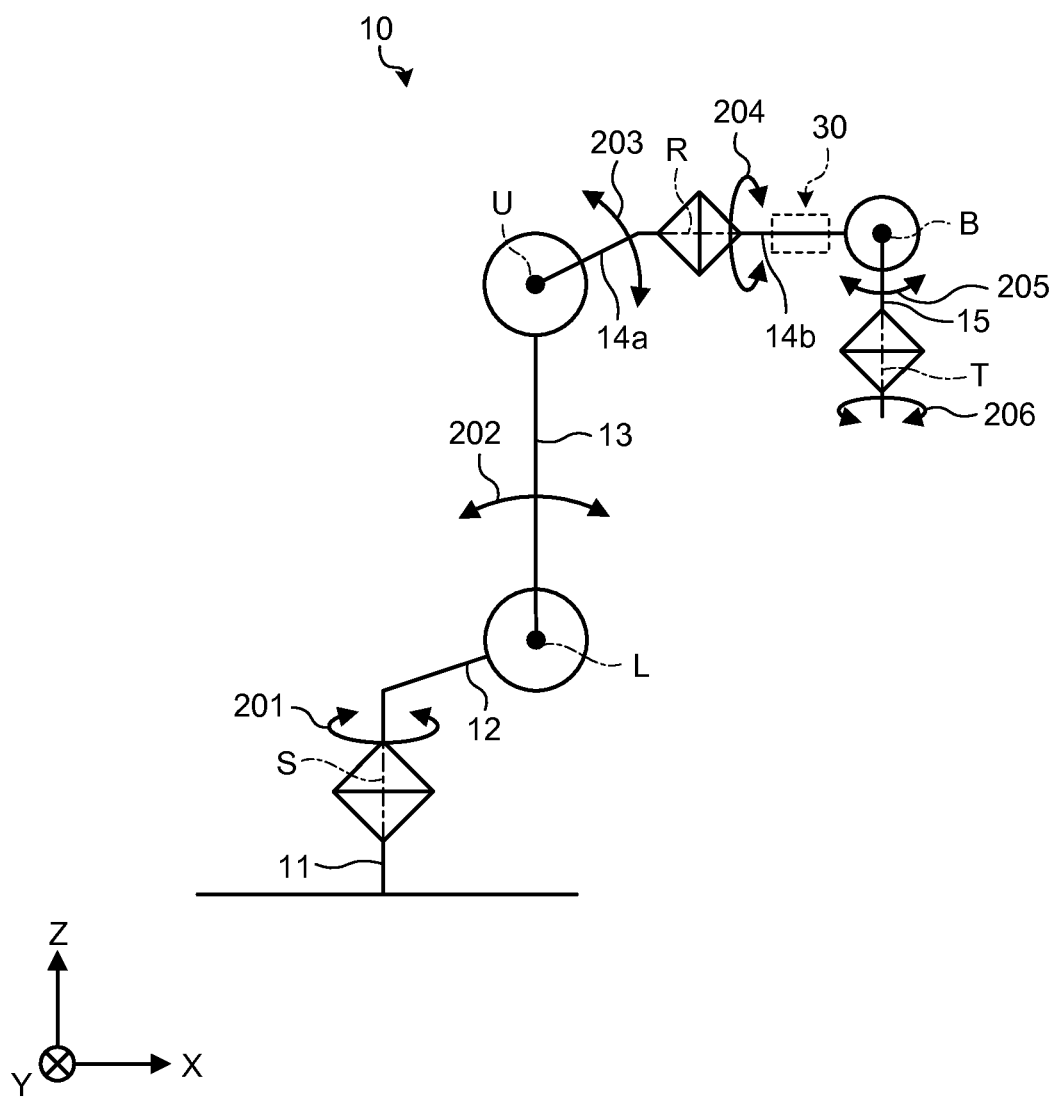
FIG. 2 is a schematic illustrating an operation of each axis of the robot and the position of a feeder.

For more comprehensible description, FIG. 2 schematically illustrates an operation of each axis of the robot 10 and the position of the feeder 30. FIG. 2 is a schematic view illustrating an operation of each axis of the robot 10 and the position of the feeder 30. In FIG. 2, the robot 10 viewed from the right lateral direction (the negative direction of the Y-axis) is quite schematically illustrated with graphic symbols indicating joints and the like.

As FIG. 2 illustrates, the pivot base 12 pivots about the S axis (see the arrow 201 in FIG. 2) with support of the base 11. The lower arm 13 swings back and forth about the L axis (see the arrow 202 in FIG. 2) with support of the pivot base 12.

The first arm 14a swings upward and downward about the U axis (see the arrow 203 in FIG. 2) with support of the lower arm 13. The forearm 14b rotates about the R axis (see the arrow 204 in FIG. 2) with support of the first arm 14a.

The feeder 30 is disposed in a manner of intersecting with the R axis between the base end portion and the tip end portion of the forearm 14b (see the rectangle in a dashed line in FIG. 2).

The wrist arm 15 swings about the B axis (see the arrow 205 in FIG. 2) with support of the forearm 14b. The tip end portion (the above-described flange 15a) of the wrist arm 15 rotates about the T axis (see the arrow 206 in FIG. 2).

As described above, the feeder 30 is disposed in a manner of intersecting with the R axis between the base end portion and the tip end portion of the forearm 14b, thereby preventing the feeder 30 from interfering with the workpiece, jigs, peripherals, and the like.

Figure 3A:
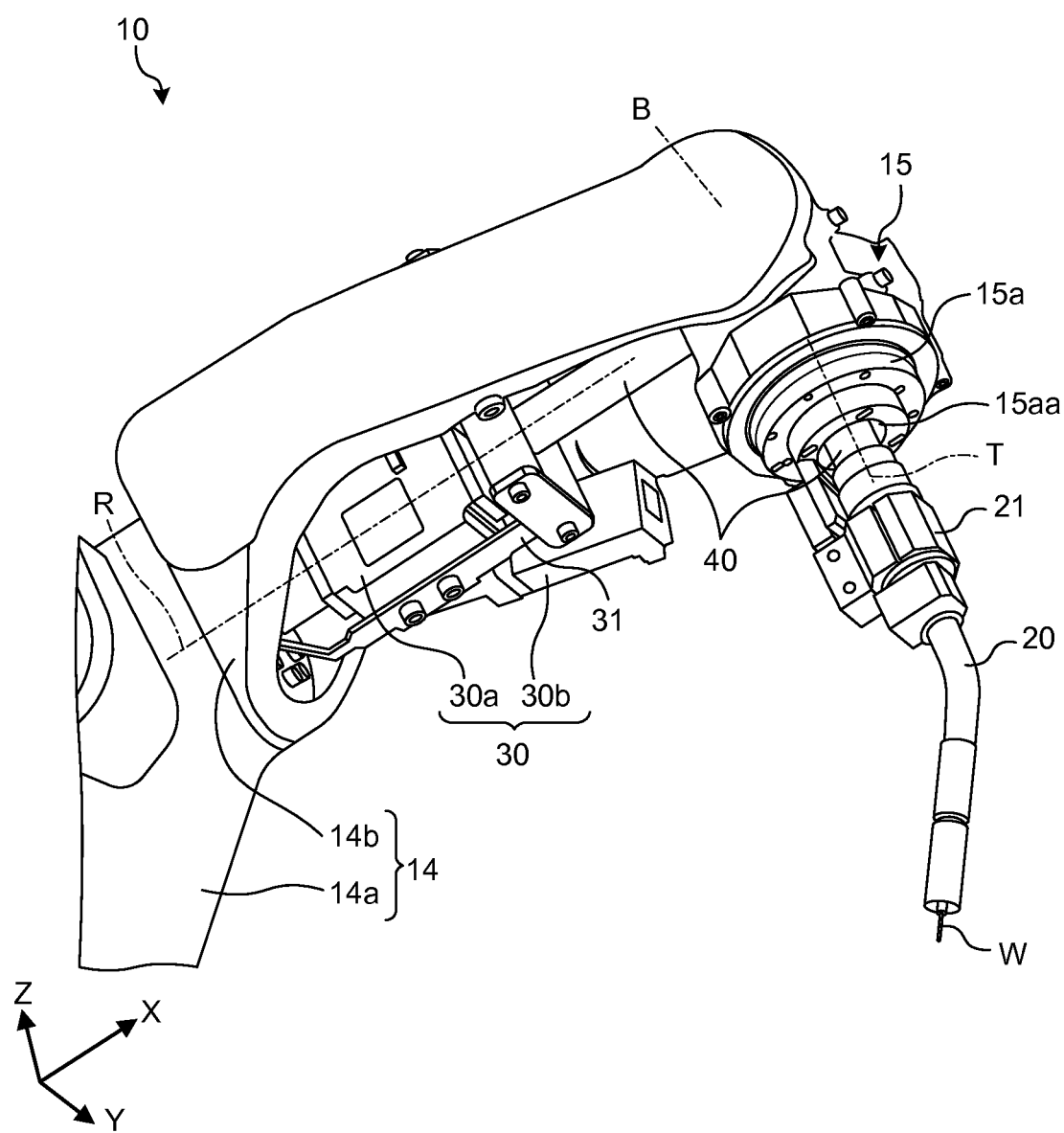
FIG. 3A is a perspective schematic view illustrating the periphery of an upper arm.

The constructional arrangement of the feeder 30 is described in detail with reference to FIG. 3A. FIG. 3A is a perspective schematic view illustrating the periphery of the upper arm 14.

As already described and as illustrated in FIG. 3A, the feeder 30 is disposed in a manner of intersecting with the R axis between the base end portion and the tip end portion of the forearm 14b. The feeder 30 draws the wire W from a wire storing device (not illustrated) such as a wire reel and feeds the torch 20 with the wire W.

The feeder 30 consists of a body 30a and a driving source 30b, which are supported by the forearm 14b with a support 31.

The body 30a includes therein a feeding mechanism (not illustrated) for the wire W that includes a feeding roller and others. The feeding mechanism is driven by the driving source 30b.

The body 30a is connected with a torch cable (cable) 40 serving as a feeding route of the wire W. The torch cable 40 is a flexible cable that includes therein a hose for supplying the wire W, a power cable, a shielding gas, and the like and through which power feeding and wire feeding are integrally performed. A cable through which power feeding and wire feeding are not integrally performed may also be used.

The torch cable 40 is routed along the R axis, inserted into a pass opening 15aa passing through the wrist arm 15, and connected to the torch 20. The torch 20 is fixed to the flange 15a with a torch clamp 21.

Figure 3C:
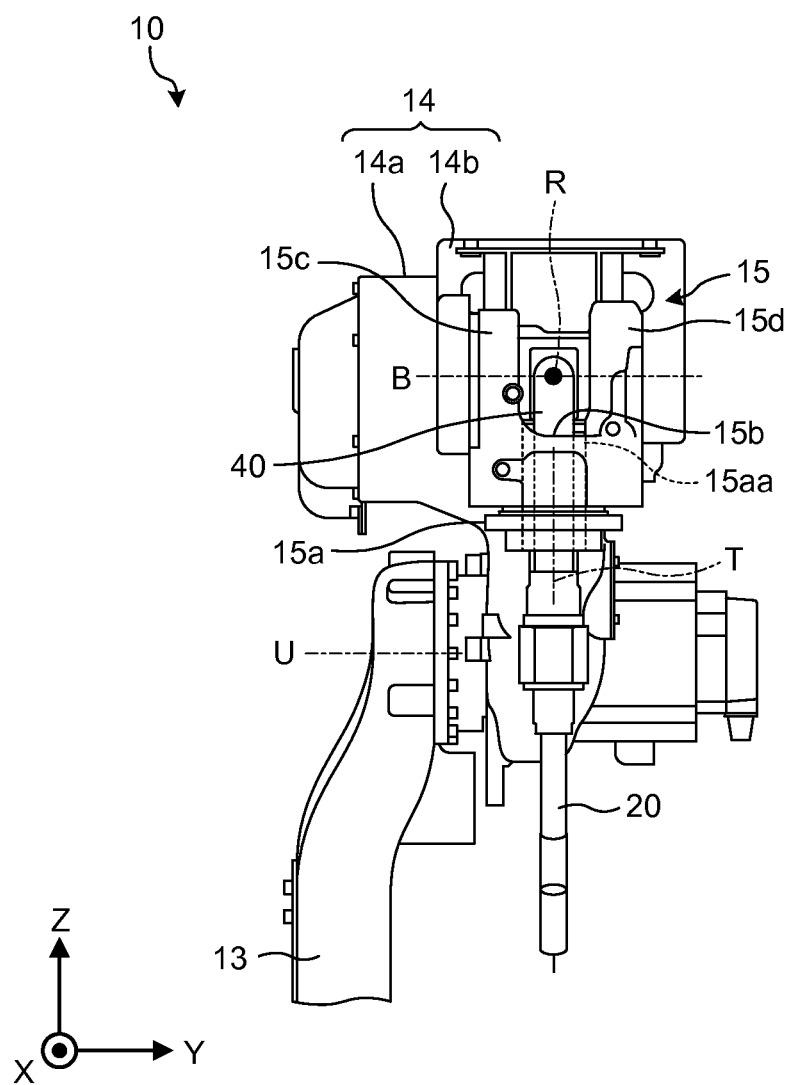
FIG. 3C is a front schematic view illustrating the periphery of the upper arm.
Figure 3D:
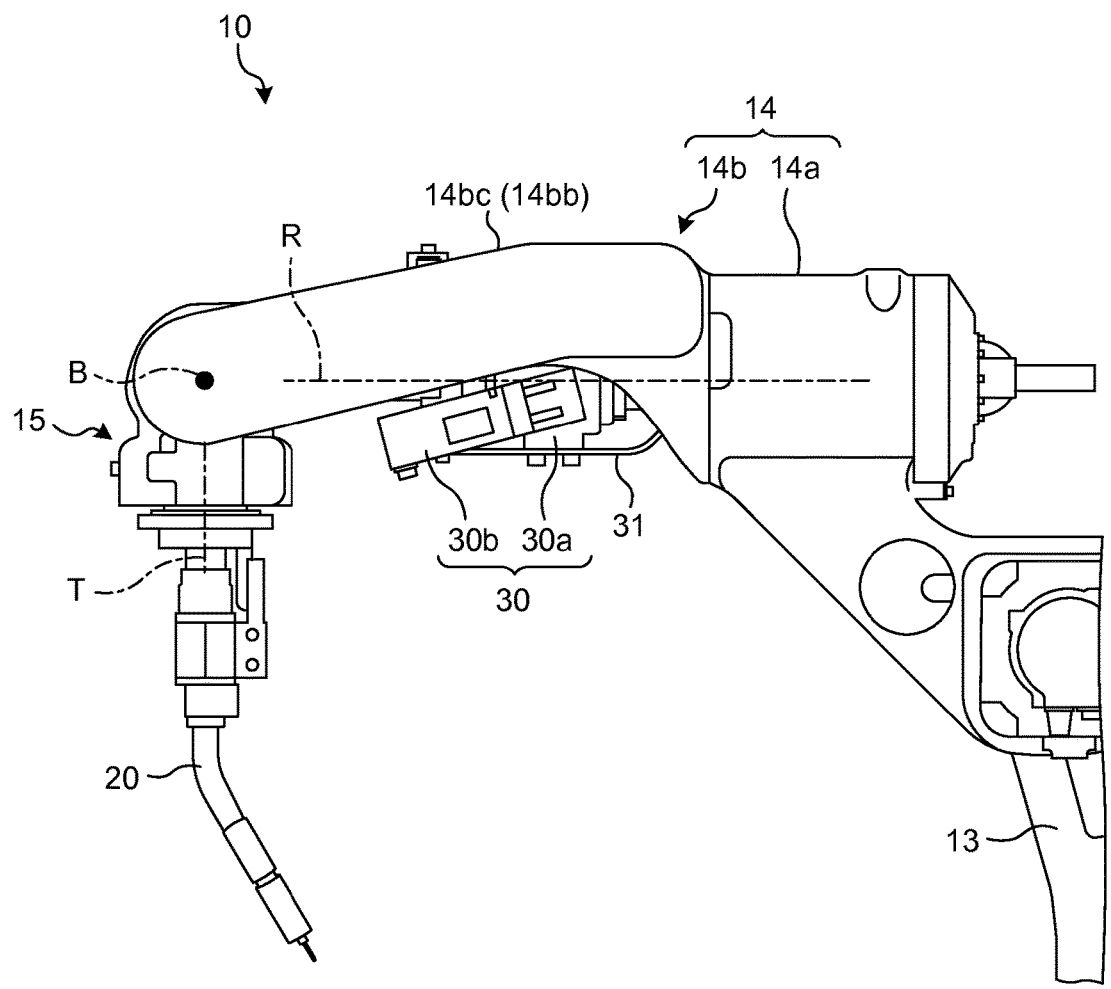
FIG. 3D is a schematic view illustrating the periphery of the upper arm viewed from its left side.

The constructional arrangement of the feeder 30 is described in more detail along with the specific configuration of the forearm 14b with reference to FIGS. 3B to 3D. FIG. 3B is a planar schematic view illustrating the periphery of the upper arm 14. FIG. 3C is a front schematic view illustrating the periphery of the upper arm 14. FIG. 3D is a schematic view illustrating the periphery of the upper arm 14 viewed from its left side.

As FIG. 3B illustrates, the forearm 14b has a bottom 14ba, a first extending portion 14bb extending from the bottom 14ba along the R axis, and a second extending portion 14bc disposed parallel to the first extending portion 14bb with a space therebetween. The forearm 14b is formed in a bifurcated shape. The first extending portion 14bb and the second extending portion 14bc support the wrist arm 15 at the respective end portions. In the upper side (the Z-axis direction in FIG. 3B) of the feeder 30, an accommodation portion 14bd that accommodates therein the servomotors M5 and M6 is formed.

The feeder 30 is disposed at an area closer to the base of the bifurcated portions of the forearm 14b and between the bifurcated portions. The area closer to the base specifically indicates the area close to the bottom 14ba serving as a mating portion of the first extending portion 14bb and the second extending portion 14bc.

This configuration secures certain distances between a movable portion about the B axis and the feeder 30 and between a movable portion about the T axis and the feeder 30, whereby the feeder 30 is less likely to be affected by such movable portions.

In specific, this configuration can prevent bending and even buckling of the torch cable 40 caused by the large compression force, which is generated between the wrist arm 15 and the feeder 30 due to a swing of the wrist arm 15 or generated between the flange 15a and the feeder 30 due to rotation of the flange 15a. This thus can eliminate disturbances in the feeding operation of the wire W.

The feeder 30 is at least disposed at an area between the bifurcated portions of the forearm 14b, which is not much far from the torch 20. This can make it possible to lower the resistance to feeding of the wire W compared with such a case where the feeder 30 is disposed behind the base end portion (the negative direction side of the Y-axis in FIG. 3B) of the upper arm 14.

The configuration capable of feeding the wire W both in the forward and backward directions during welding is thus applicable to the feeder 30. This makes the feeding operation of the wire W more responsive while preventing interference of the feeder 30.

As FIG. 3B illustrates, the torch cable 40 is routed along the R axis between the bifurcated portions of the forearm 14b. This prevents disorderly movement of the torch cable 40 resulting from rotation of the forearm 14b about the R axis and accordingly eliminates disturbances in the feeding operation of the wire W.

The configuration of the wrist arm 15 is now described. As FIG. 3B illustrates, the wrist arm 15 has a bottom 15b, a first portion 15c extending from the bottom 15b along the T axis, and a second portion 15d disposed parallel to the first portion 15c with a space formed therebetween. The wrist arm 15 is formed in a bifurcated shape that is substantially a U-shape in the front view.

As FIG. 3C illustrates, the torch cable 40 that extends while being routed along the R axis from the feeder 30 is inserted into the pass opening 15aa while being routed between the bifurcated portions of the wrist arm 15, and connected to the torch 20.

Positioning of the driving source 30b of the feeder 30 is now described. As FIG. 3D illustrates, the driving source 30b of the feeder 30 is configured such that the driving source 30b protrudes outside the bifurcated portions of the forearm 14b. Specifically, the driving source 30b protrudes downward (the negative direction side of the Z-axis in FIG. 3D) from a space between the first extending portion 14bb and the second extending portion 14bc when the robot 10 is in the standard posture (see FIG. 1). It is, however, possible to configure the driving source 30b of the feeder 30 such that the driving source 30b does not protrude from the space between the first extending portion 14bb and the second extending portion 14bc, depending on the shape and the kind of the driving source 30b.

This facilitates replacement, maintenance, and other operations of at least the driving source 30b. In other words, the configuration increases maintainability of the feeder 30.

Figure 4:
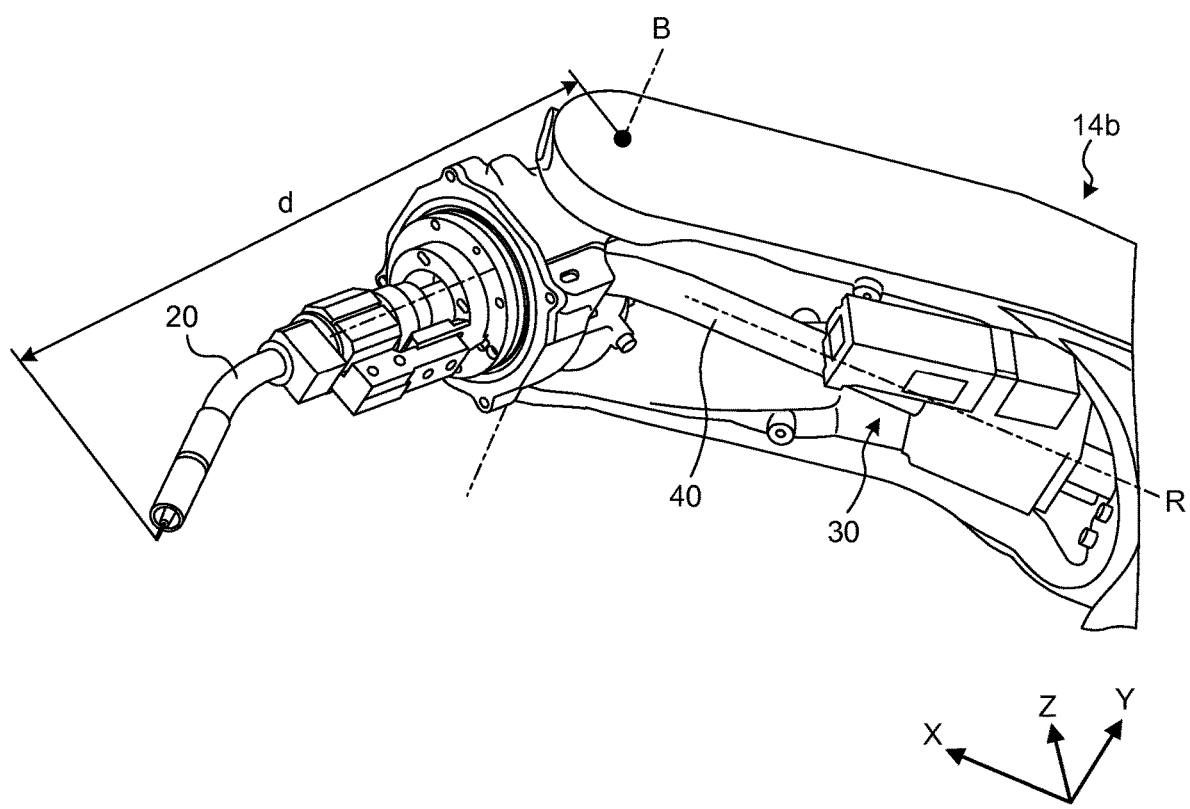
FIG. 4 is a schematic view for explaining advantageous effects exerted by the constructional arrangement of the feeder of the embodiment.

The following explains advantageous effects exerted by the constructional arrangement of the feeder 30 as described earlier, with reference to FIG. 4. FIG. 4 is a schematic view for explaining advantageous effects exerted by the constructional arrangement of the feeder 30 of the embodiment.

A comparative example of a constructional arrangement is firstly described. In the description, like numerals indicate like members that share the same function between the comparative example and the embodiment.

In the comparative technique, the feeder 30 is provided at the tip of the wrist arm 15 to make the feeding operation of the wire W more responsive. In this case, the feeder 30 is disposed between the wrist arm 15 and the torch 20.

Such a configuration in the comparative technique often increases the distance (corresponding to the distance d in FIG. 4) from the B axis to the tip of the torch 20 and thus restricts welding postures that the robot 10 can take. Even if the robot 10 can take a required welding posture, the robot 10 needs to make unnecessarily large motion to take the posture.

With the constructional arrangement of the feeder 30 according to the embodiment, the distance d from the B axis to the tip of the torch 20 in FIG. 4 is shortened. This enables the robot 10 to easily take various welding postures which have been conventionally unadoptable.

Furthermore, the robot 10 can take welding postures without making unnecessarily large motion, thereby shortening the operation time of the robot 10. In other words, it is possible to shorten the time for working processes.

As FIG. 4 illustrates, the feeder 30 is disposed between the bifurcated portions of the forearm 14b. This prevents interference of the feeder 30 and reduces, for example, the number of spatters adhering thereto. Damage, failure, and other disadvantages of the feeder 30 are accordingly prevented.

As FIG. 4 illustrates, the feeder 30 is disposed at an area between the bifurcated portions of the forearm 14b and closer to the base of the bifurcated portions. With this, such problems less occur that the feeding operation of the wire W is disturbed by bending or the like of the torch cable 40 and that responsiveness of the feeding operation of the wire W is damaged.

This configuration thus enables the robot 10 to perform the welding operation with higher quality. Furthermore, as described above, use of the feeder 30 capable of feeding the wire W both in the forward and backward directions also exerts advantageous effects for a higher-quality welding operation.

As already described, the robot according to the embodiment includes a flange, a wrist arm, a forearm, and a feeder. The flange configured so that a welding torch is attached thereto and configured to rotate about a T axis. The wrist arm configured to rotate about a B axis substantially perpendicular to the T axis and configured to support the flange.

The forearm configured to support the wrist arm. The feeder attached to a position between a base end and a tip end of the forearm and configured to feed a welding wire.

The robot according to the embodiment can easily take various welding postures without interference.

In the embodiment as described above, a robot used for arc welding is given as an example; however, this is not intended to limit the kind of work performed by the robot. The embodiment is also applicable to such a case that uses a hand, instead of the welding torch, capable of holding a workpiece as an end effector and assembles the workpiece while feeding the hand with a wire-type member using a feeder.

The embodiment is not intended to limit the shape of an arm of the robot. For example, the forearm 14b in the embodiment is not limited to a bifurcated shape. Any shapes capable of swingably supporting the wrist arm 15 are applicable.

A multi-axis robot having a six-axis described in the embodiment is illustrative, and the embodiment is not intended to limit the number of axes. A robot having a seven-axis is also applicable.

A single-arm robot described in the embodiment is illustrative and not a limiting example. The embodiment may be applied for at least any one of arms equipped to a multi-arm robot with two or more arms.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot comprising:
    a flange configured so that a welding torch is to be attached thereto and configured to rotate about a T axis;
    a wrist arm configured to rotate about a B axis substantially perpendicular to the T axis and configured to support the flange;
    a forearm configured to support the wrist arm and including bifurcated portions;
    a first arm configured to support the forearm at a base end of the forearm such that the forearm rotates about an R axis substantially perpendicular to the B axis, the first arm being supported at a base end portion of the first arm so as to rotate about a U axis substantially perpendicular to the R axis;
    a cable that is a feeding route of a welding wire and is routed along the R axis, the welding wire being fed to the welding torch; and
    a feeder provided between the bifurcated portions of the forearm at a position closer to the base end of the forearm than to a tip end of the forearm opposite to the base end, the position being between the base end of the forearm and the tip end of the forearm so as to intersect with the R axis and rotate together with the forearm, and configured to feed the welding wire, wherein
    the feeder includes a body and a driving source, the body includes a feeding mechanism for the welding wire, and the driving source is configured to drive the feeding mechanism, the B axis and the R axis both extend within a plane,
the U axis is located at a first distance from the plane in a direction that is perpendicular to the plane when the U axis and the plane are oriented in parallel to each other,
the wrist arm has a length from the B axis to a tip end of the wrist arm that is less than the first distance,
the welding torch is to be directly attached to the flange supported by the tip end of the wrist arm,
the body is disposed to extend parallel to the R axis between the bifurcated portions, and
the driving source is provided to extend non-parallel to the R axis, the driving source is provided to extend parallel to an outline of the bifurcated portions and below the bifurcated portions of the forearm when viewed in a direction parallel to the B axis, and the driving source is provided so as to abut the body and not to protrude from the forearm when viewed in a direction parallel to the T axis.

2. The robot according to claim 1, further comprising the welding torch.

3. The robot according to claim 1, further comprising:
a base fixed to an installation object;
a pivot base configured to connect to the base rotatably about an S axis substantially perpendicular to an installation surface of the installation object;
a lower arm configured to connect to the pivot base rotatably about an L axis substantially perpendicular to the S axis; and
an upper arm configured to be supported on the lower arm rotatably about a U axis substantially parallel to the L axis.

4. The robot according to claim 3, further comprising the welding torch.

5. The robot according to claim 3, wherein
the upper arm includes the forearm and the first arm,
the first arm is supported on the lower arm rotatably about the U axis at the base end portion of the first arm, and
the first arm supports the base end portion of the forearm at a tip end portion of the first arm.

6. The robot according to claim 1, wherein the feeder is capable of feeding the welding wire both in a forward direction and a backward direction during welding.

7. The robot according to claim 6, further comprising the welding torch.

8. The robot according to claim 1, wherein the first arm supports the forearm at a tip end portion of the first arm.

9. The robot according to claim 1, wherein the forearm supports the wrist arm at the tip end of the forearm.

* * * * *